Dec. 12, 1950 L. SOBIE 2,533,968
AUTOMATIC THROTTLE CONTROL
Filed Dec. 28, 1948 2 Sheets-Sheet 2
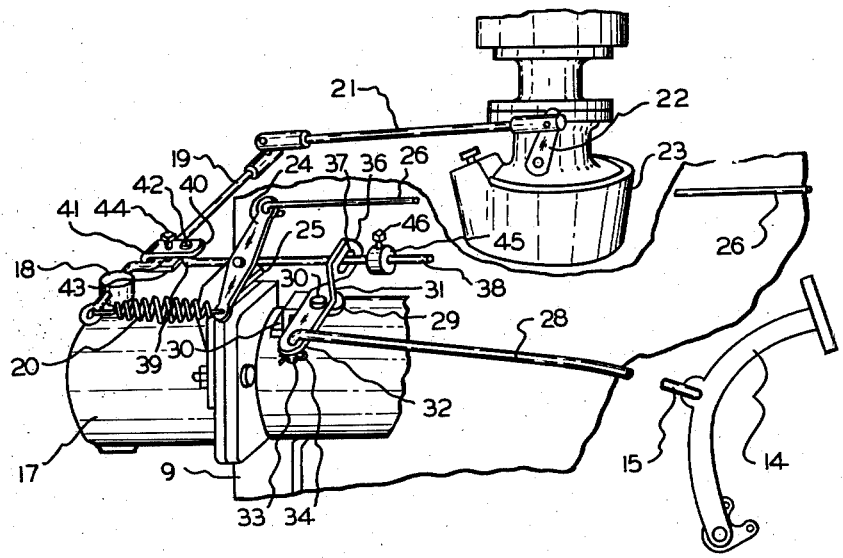
FIG. II.
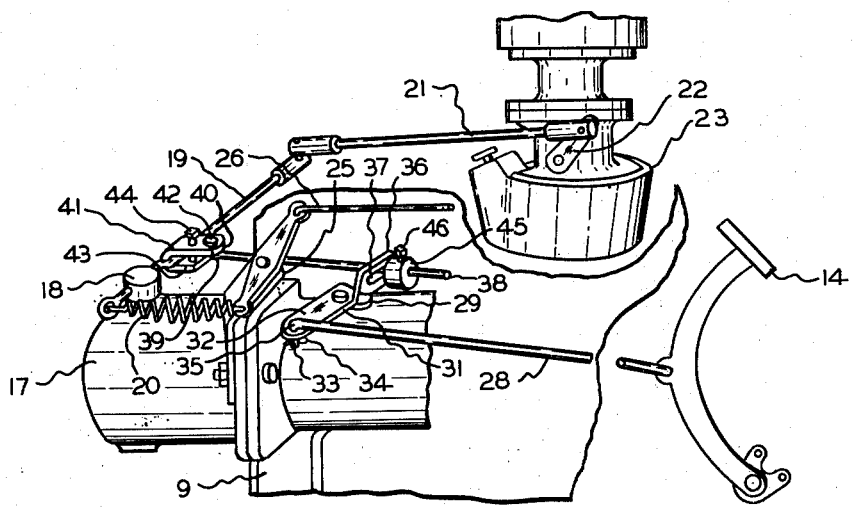
FIG. III.
INVENTOR.
BY Leo Sobie
Beaman Patch
ATTORNEYS _Patented Dec. 12, 1950_

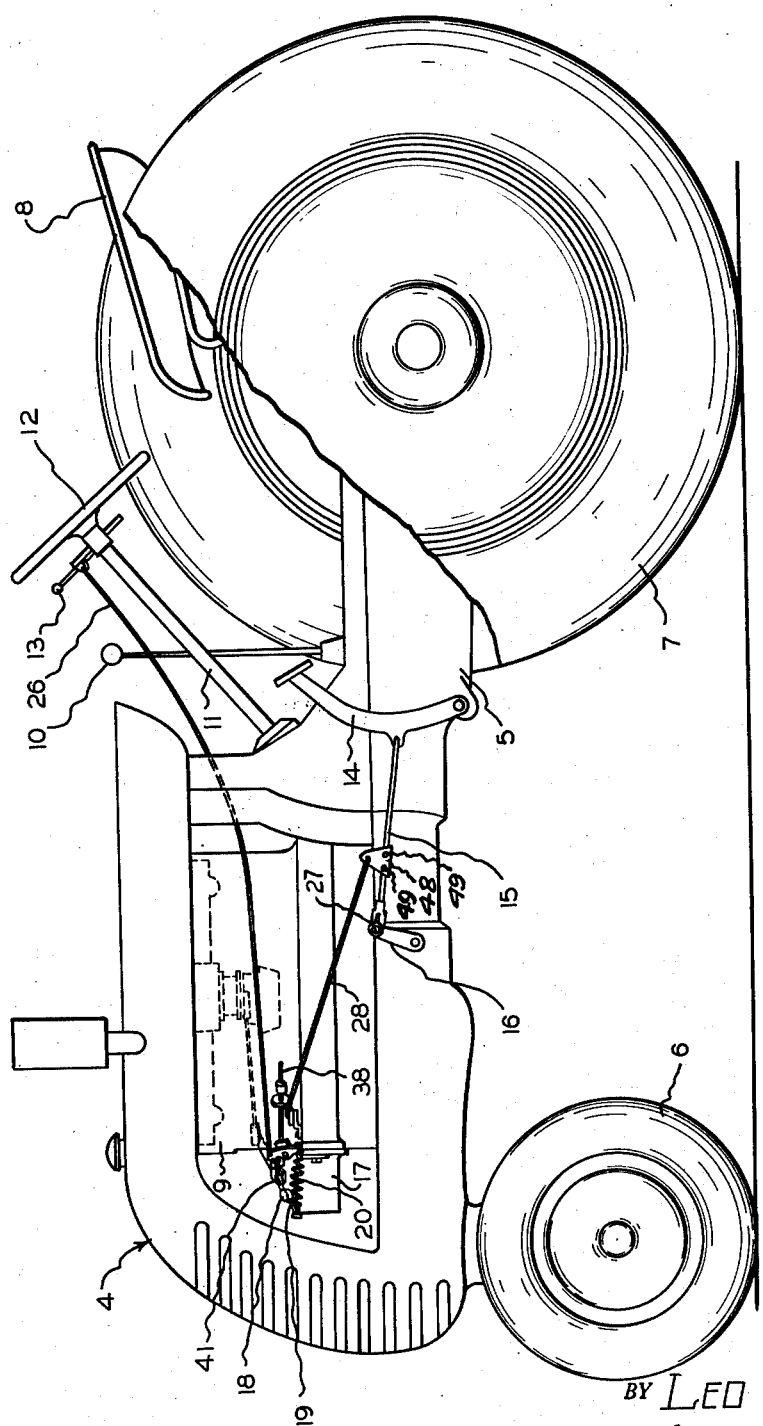

2,533,968

UNITED STATES PATENT OFFICE 2,533,968

AUTOMATIC THROTTLE CONTROL

Leo Sobie, Jonesville, Mich.

Application December 28, 1948, Serial No. 67,658

2 Claims. (Cl. 192—.084)

This invention relates to clutch actuated throttle controls for farm tractors and the like, and particularly to automatic clutch actuated throttle control means for controlling a tractor throttle when the motor of the tractor is idling and the clutch disengaged.

It is an important object of the invention providing a mechanism which is capable of ready application to the motor of a tractor to control the idling of the tractor motor to prevent undue racing thereof when the clutch is disengaged without moving the throttle by hand, which leaves both hands free to shift gears, adjust levers or to operate the hydraulic control of the tractor.

A further object is to avoid the necessity of rebuilding the farm tractor and thus going to great expense when it is desired to include in the structure thereof means for controlling the speed of the motor and instead mounting an automatic control on the tractor in the form of an attachment thereon with connections to the clutch pedal and the throttle control connected to the steering post.

An ancillary object is to have such a clutch actuatable throttle control attachment which is simple to apply and operate, and is capable of being readily manufactured at reasonable cost to encourage adoption of the attachment among farmers owning such tractors.

Further objects and advantages of the invention will appear in further detail as the specification proceeds.

In order to facilitate ready comprehension of this invention for proper appreciation of the salient features thereof, the invention is illustrated on the accompanying drawings forming part hereof, and in which:

Fig. I is a side elevation of a farm tractor illustrating an attachment thereon embodying the invention in practical form and connected both to the clutch pedal and the throttle connected to the steering post, Fig. II is an enlarged side elevation of certain parts of the tractor showing the attachment embodying the invention in better detail, and substantially in position ready to operate, Fig. III is another view of the same parts shown in Fig. II displaying the attachment with its parts in operated position.

In the views, the same reference numerals indicate the same parts.

When a farm tractor is operated, it is quite natural that several times during the day changes are made in the running of the tractor, levers being adjusted, gears shifted, and the tractor stopped, while the motor runs continuously through it all. However, at such intervals, the clutch is disengaged and the motor tends to race, wasting fuel and shortening the effective life of the motor, inasmuch as the intervals add up to an hour or more each day of such racing of the motor.

Upon considering this problem, it has occurred to me that if disengagement of the clutch could be caused to automatically operate the throttle in such fashion as to cut down the speed of the motor, the latter would be prevented from racing at all times with consequent increase of service given by the motor and noticeable saving of fuel. As a result, I have succeeded in providing a clutch actuatable throttle control mechanism which is capable of being manufactured and sold as a separate piece of mechanism capable of being readily and easily applied to a tractor and as will now be particularly described.

Hence, in the practice of my invention, and referring again to the drawings, a tractor generally indicated at 4, includes a frame 5, front and rear wheels 6 and 7, the operator's seat 8, the motor 9, gear shift lever 10, steering post 11 surmounted by steering wheel 12 and having a throttle control 13, and a pivotally mounted clutch pedal 14. Suffice to state that the clutch pedal 14 is connected by a link 15 to the clutch lever 16, and the motor governor 17 has a pivot 18 with a governor arm 19 fixed thereto with a counter-clockwise bias by a spring 20 at the near end, this arm 19 at the far end being connected to the carburetor control rod 21, which in turn is connected to the operating arm or lever 22 of the carburetor 23. The other end of spring 20 is connected to the outer end of a lever 24 pivoted on a bracket 25 upon governor 17, while the inner end of the lever is connected by means of the throttle control rod or wire 26 to throttle member 13 on steering post 11, all of these parts being more-or-less conventional and merely forming a locale for the invention to be particularly set forth in detail.

To the pivot mounting or pin 27, serving to connect the arm 16 of the clutch with link 15 of clutch pedal 14, is connected the rear end of a curved or bent operating rod 28. A bracket 29 is secured by a screw or bolt 30 upon the motor rearwardly of governor 17. Pivotally mounted upon bracket 29 by pivot pin 30 is a first class lever 31 to the outer end 32 of which the forward downwardly-hooked end 33 is connected to the previously mentioned operating rod 28, cotter pin 34 serving to retain the hooked end 33 in engagement with the end 32 of lever 31, while the pivot aperture 35 in the end 32 receives the mentioned hooked end 33 of rod 28. The inner end 36 of lever 31 is provided with an elongated slot 37, through which a rearwardly extending rod 38 projects freely and slidably, the forward end 39 being bent outwardly and extending through a rearwardly directed lug 40 of a clamp 41, the upwardly extending end 39 terminating above lug 40 in a head 42 preventing the end from dropping down through the lug and thereby maintaining permanent pivotal connection therewith. As the clamp 41 is preferably of U-shape, the lower end 43 thereof is connected by means of an adjusting screw 44 to the other limb of lug 40 which serves to clamp the two portions of the arm on the previously described governor arm 19, rearwardly of its pivot 18. Upon the rear end of rod 38 is fixed a stop collar 45 at a predetermined distance rearwardly of slotted end 36 of lever 31 in such fashion that forward movement of operating rod 28 by means of clutch pedal 14 with consequent clockwise rotation of lever 31 about pivot 30 is possible within certain limits before the slotted end 36 strikes the stop collar 45. The arrangement is such that when clutch lever 14 is pushed forward from the position of Fig. II which corresponds substantially with that shown also on a smaller scale in Fig. I wherein the clutch arm 16 occupies an engaged condition of clutch to that shown in Fig. III which corresponds to a disengaged condition of the clutch, the operating end 36 of lever 31 at first strikes collar 45 while the clutch is about to be engaged by the forward movement of pedal 14. As soon as the pedal is moved sufficiently to actually disengage the clutch, the lever 31 operates to push collar 45 and thereby rod 38 rearwardly and this in turn, by means of the upwardly directed hooked end 39 of this rod, will cause clamp 41 to draw governor arm 19 clockwise, whereby link 21 is operated rearwardly and consequently carburetor arm 22 is partly rotated clockwise to partly close the carburetor and cut down the feeding of fuel and air mixture to the engine. The internal details of the carburetor are superfluous to show as this type of operation is well known with respect to the carburetor per se. Suffice to state at this point when the foot depresses clutch release pedal 14 sufficiently to release the clutch and disengage the engine from the operating parts of the tractor in conventional manner, this also automatically causes the governor arm and its connection with carburetor 23 to operate in such fashion as to cut down the feeding of the fuel to the motor, preventing the latter from racing for sheer lack of fuel and air mixture with a result that the motor slows down instead of starting to race when the clutch is disengaged. By the same token the engagement of the clutch again by release of the foot from pedal 14 removes the operating end 36 of the lever 31 from the collar 45, thereby allowing spring 30 to exert its normal bias on the outer end of governor arm 19, restoring the carburetor rod or link 21 and arm 22 to the normal operating position shown in Fig. II.

Manifestly variations may be resorted to and parts and features may be modified or used without others within the scope of the appended claims.

I claim:

1. For combination with a tractor having a clutch pedal, an engine with a governor associated therewith and provided with a governor pivot, a governor arm fixed within one end thereof to the pivot, a carburetor link connected to the other or inner end of the governor arm and to the operating arm of the carburetor of said engine, a throttle control member on the steering post of the tractor, a lever pivoted intermediate the ends thereof upon a portion associated with the governor, one end of the lever having a throttle control wire or rod interconnecting it with the throttle control member on said steering post, and a spring interconnecting the other end with the first mentioned one end of said governor arm, the provision of a mechanism adapted for connection between the clutch pedal and the throttle actuator to synchronize the clutch pedal movement with the throttle such that the tractor engine is automatically throttled-down to an idled condition when the clutch is disengaged without disturbing the initial hand setting of the throttle, so that the latter is restored to its original position when the clutch is again engaged, said mechanism comprising the combination of an automatic throttle control including a rod forming a link adapted to be connected at the one or forward end to the governor arm intermediate the inner end thereof and the governor pivot, a forwardly extending operating rod adapted to be connected to the clutch release pedal, a lever adapted to be pivoted intermediate the ends thereof upon a portion of said engine with the ends thereof connected to the rear end of the link and, by a lost motion connection, to the operating rod for automatically operating said governor arm and carburetor arm upon depressing the clutch release pedal to disengage said clutch.

2. For combination with a tractor having a clutch pedal, an engine with a governor associated therewith and provided with a governor pivot, a governor arm fixed within one end thereof to the pivot, a carburetor link connected to the other or inner end of the governor arm and to the operating arm of the carburetor of said engine, a throttle control member on the steering post of the tractor, a lever pivoted intermediate the ends thereof upon a portion associated with the governor, one end of the lever having a throttle control wire or rod interconnecting it with the throttle control member on said steering post, and a spring interconnecting the other end with the first mentioned one end of said governor arm, the provision of a mechanism adapted for connection between the clutch pedal and the throttle actuator to synchronize the clutch pedal movement with the throttle such that the tractor engine is automatically throttled-down to an idled condition when the clutch is disengaged without disturbing the initial hand setting of the throttle, so that the latter is restored to its original position when the clutch is again engaged, said mechanism comprising the combination of a pivot mounting adapted to be clamped upon the governor arm intermediate the inner end thereof and the governor pivot, a rearwardly extending rod forming a link having the forward end thereof pivotally connected to the pivot mounting, a stop fixed upon the latter rearwardly extending rod adjacent the rear end thereof, an operating rod adapted to be operatively connected at the rear end thereof to said clutch pedal, a further lever pivoted intermediate the ends thereof upon a portion adapted to be fixedly associated with said engine, a pivotal connection between the outer end of the further lever and the forward end of the latter operating rod, and a slotted end upon the inner extremity of said further lever through which the rear end of said rearwardly extending rod projects with the stop thereon normally disposed a predetermined distance rearwardly of the slotted end of said further lever in the engaged condition of the clutch.

LEO SOBIE.

REFERENCES CITED

The following references are of record in the file of this patent:

UNITED STATES PATENTS

| Number | Name | Date |
|---|---|---|
| 1,194,479 | Clay et al. | Aug. 15, 1916 |
| 1,620,763 | Hull | Mar. 15, 1927 |
| 1,620,764 | Hull | Mar. 15, 1927 |
| 2,167,110 | Gutenberg et al. | July 25, 1939 |
| 2,283,478 | Warren | May 19, 1942 |